US008195940B2

(12) United States Patent
Lioy et al.

(10) Patent No.: US 8,195,940 B2
(45) Date of Patent: Jun. 5, 2012

(54) KEY UPDATES IN A MOBILE WIRELESS SYSTEM

(75) Inventors: Marcello Lioy, San Diego, CA (US); Jeff Dyck, San Diego, CA (US); Roy Franklin Quick, Jr., San Diego, CA (US); Jayanth Mandayam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2667 days.

(21) Appl. No.: 10/406,670

(22) Filed: Apr. 2, 2003

(65) Prior Publication Data

US 2003/0220107 A1 Nov. 27, 2003

(51) Int. Cl.
*H04L 9/32* (2006.01)
(52) U.S. Cl. ......... 713/169; 713/171; 713/182; 455/410
(58) Field of Classification Search .................. 380/247, 380/257, 270–287; 713/168, 171, 169, 155, 713/182; 455/410
See application file for complete search history.

(56) References Cited

U.S. PATENT DOCUMENTS

| | | | | |
|---|---|---|---|---|
| 5,390,252 A * | 2/1995 | Suzuki et al. | ................. | 380/247 |
| 6,466,964 B1 * | 10/2002 | Leung et al. | .................. | 709/202 |
| 6,477,644 B1 * | 11/2002 | Turunen | ......................... | 713/161 |
| 6,496,704 B2 * | 12/2002 | Yuan | ............................. | 455/466 |
| 6,501,767 B1 * | 12/2002 | Inoue et al. | .................... | 370/465 |
| 6,839,434 B1 * | 1/2005 | Mizikovsky | .................. | 380/247 |
| 7,099,476 B2 * | 8/2006 | Chen et al. | ..................... | 380/277 |
| 7,107,620 B2 * | 9/2006 | Haverinen et al. | .............. | 726/29 |
| 7,308,260 B2 * | 12/2007 | Mandayam et al. | ........ | 455/435.1 |
| 7,418,596 B1 * | 8/2008 | Carroll et al. | ................. | 713/169 |
| 7,421,079 B2 * | 9/2008 | Freeman et al. | ............. | 380/277 |
| 7,555,528 B2 * | 6/2009 | Rezvani et al. | ............... | 709/217 |
| 2002/0120844 A1 * | 8/2002 | Faccin et al. | ................... | 713/168 |
| 2002/0191572 A1 * | 12/2002 | Weinstein et al. | ............ | 370/338 |
| 2003/0021418 A1 * | 1/2003 | Arakawa et al. | ............. | 380/277 |
| 2003/0028763 A1 * | 2/2003 | Malinen et al. | ............... | 713/155 |
| 2004/0153525 A1 * | 8/2004 | Borella | ......................... | 709/217 |
| 2006/0013398 A1 * | 1/2006 | Halasz et al. | ................ | 380/273 |
| 2006/0133614 A1 * | 6/2006 | Zhang et al. | .................. | 380/273 |

FOREIGN PATENT DOCUMENTS

| | | |
|---|---|---|
| EP | 1073233 | 1/2001 |
| WO | 0176125 | 10/2001 |

OTHER PUBLICATIONS

U.S. Appl. No. 60/367,203, filed Mar. 26, 2002, Carroll et al.*
International Search Report—PCT/US2003/010512, International Search Authority—European Patent Office—Apr. 7, 2003.

* cited by examiner

*Primary Examiner* — Simon Sing
*Assistant Examiner* — Simon King
(74) *Attorney, Agent, or Firm* — Won Tae Kim

(57) ABSTRACT

This disclosure describes a key update scheme for use in a mobile IP network. The update scheme may be implemented to facilitate key updates between a mobile device and a server computer that authenticates the mobile device. The techniques described herein can facilitate key updates in a manner that accounts for potential message loss during the update routine, mobile device failure during the update routine, or other problems typically encountered in a mobile network settings. In this manner, the techniques can provide a robust scheme for key updates and may improve network security.

33 Claims, 6 Drawing Sheets

KEY UPDATES IN A MOBILE WIRELESS SYSTEM

FIELD

This disclosure relates to mobile devices configured to support a mobile wireless network protocol, and servers configured for authentication, authorization and accounting (AAA) of mobile devices in a mobile network environment.

BACKGROUND

In a communication network, network nodes exchange data using network communication protocols. Internet Protocol (IP) is an example of a network communication protocol that facilitates packetized data communication between network nodes. Mobile IP is an example of a protocol that facilitates the use of mobile computing devices in packet-based networks. In other words, Mobile IP protocol enables node mobility in the network. Examples of mobile computing devices that can run Mobile IP protocol include: laptop computers; personal digital assistants (PDA); data terminals; data collection devices; other computing devices; and mobile phones, such as cellular phones and satellite phones.

Mobile IP can enable a mobile device to send and receive packets associated with packet-based communication applications such as web browsing, email, messaging or the like. Packet-based networks typically make use of network addresses, such as IP addresses in the case of the Internet, to identify the devices in the network. Data is routed to and from the devices based on these IP addresses. Mobile devices, however, can move to different locations in the network. For this reason, Mobile IP allows packets to be rerouted to the mobile device's current point of attachment via a tunneling process.

In mobile IP, the mobile device is assigned a home agent (HA), which is typically a router or another entity on the mobile device's home sub-network. When the mobile device is away from home, it can be assigned a foreign agent (FA). A foreign agent is typically a router on the mobile device's visited sub-network that provides routing services to the mobile device when it is attached to the visited sub-network.

Information sent to the mobile device's home address can be rerouted to the mobile device, through the foreign agent, via a process referred to as tunneling. In particular, the HA tunnels the packets to the FA once the mobile device has registered through the FA. The FA can then deliver the packets to the mobile device. In particular, when the FA receives a registration reply (RRP) from a mobile device, it updates its routing table by reading the Home Address field of the RRP packet. In this manner, packets tunneled from the HA to the FA can be properly delivered to the mobile device. In addition, the foreign agent may serve as a default router for sending packets from the mobile device to other devices attached to the network.

An AAA (authentication, authorization and accounting) server refers to a server computer that performs authentication, authorization and accounting functions. AAA servers are typically maintained by an Internet service provider (ISP). In Mobile IP, the AAA server may authenticate and authorize a mobile device to access the network, and can provide accounting information for billing purposes.

In a network in accordance with industry specification IS-835 published by the Telecommunications Industry Association/Electronics Industry Association (TIA/EIA), in order to access the network, the mobile device sends the FA a registration request (RRQ) formed using a key. In particular, the key can be used to authenticate the user of the mobile device. For example, the mobile device may transmit the key according to a password authentication protocol (PAP). Alternatively, in an insecure system, the mobile device may generate an authenticator value formed using the key. For example, the mobile device may generate a response to a challenge handshake authentication protocol (CHAP) using the key.

In any case, after the mobile device sends the RRQ formed using the key, the FA translates the RRQ to an access request (ARQ) and sends the ARQ to an AAA server. The FA then forwards the registration request to the HA if the AAA authorizes access. Packet tunneling can then be used to deliver packets from the HA to the FA, and the FA can deliver the packets to the mobile device.

In certain instances, it may be desirable to change the key of a mobile device. For example, if a maverick device gains access to the key, the maverick device may be able to access the packet-based network as an unauthorized user. In this disclosure a "maverick device" refers to a device that accesses or attempts to access a network using the key of another device. If successful, the maverick device may be able to impersonate the other device. Worse yet, the maverick device may use the key to access the Internet under the guise of another user, and perform cyber-crime, cyber-terrorism, or the like. Therefore, it is often desirable to change the key of a mobile device, such as in response to a known maverick threat, or on a periodic basis to anticipate and thwart potential maverick threats.

SUMMARY

This disclosure is directed to a key update scheme for use in mobile IP networks. The update scheme may be implemented to facilitate key updates between a mobile device and a server computer that authenticates the mobile device. The techniques described herein can facilitate key updates in a manner that accounts for potential message loss during the update routine, mobile device failure during the update routine, or other problems typically encountered in a mobile network environment. In one embodiment, state machines can be implemented to cause retransmissions of one or more messages in response to the reception or non-reception of messages in the update scheme. In this manner, the techniques can provide a robust scheme for key updates and can improve network security.

One method is disclosed in which a network device (such as a server computer that authenticates a mobile device that is attempting to access the network) receives a first registration request from a mobile device. The first registration request is an attempt by the mobile device to access the network. The first registration request is formed using a key. The method further includes sending a first reply to the mobile device in response to the first registration request. The first reply indicates that a key update is necessary to access the network. A second registration request including a new key is then sent by the mobile device and received by the network device. The second registration request indicates that the new key was received. A second reply is then sent to the mobile device by the network device in response to the second registration request. If, however, the mobile device does not receive the second reply, then the mobile device retransmits the second registration request. If the network device receives the second registration request for a second time, then the network device retransmits the second reply. A third registration request is then transmitted by the mobile device and received by the network device. If the third registration request is formed using the new key, then access to the network is granted.

Another method is disclosed in which a first registration request formed using a key to request access to a network is sent by a mobile device. A first reply indicating that a key update is necessary to access the network is transmitted by a network device (such as a server computer that authenticates a mobile device that is attempting to access the network) and received by the mobile device. A second registration request including a new key is sent by the mobile device in response to the first reply. If, however, the network device does not receive the second registration request transmitted by the mobile device, then the network device transmits another first reply indicating that a key update is necessary to access the network. Another second registration request including the new key is transmitted by the mobile device in response to receiving another first reply. In response to the network device receiving the second registration request, a second reply is transmitted by the network unit indicating that the new key was received. The mobile device then sends a third registration request. If the third registration request is formed using the new key, then access is granted to the network.

These and other techniques described herein may be executed by mobile devices or servers that provide network access to mobile devices. In either case, the techniques may be implemented in hardware, software, firmware, or any combination thereof. Various embodiments may be directed to the mobile device, the server, or circuitry that forms part of such a device or server to execute one of the techniques described herein. For some software embodiments, the techniques may be embodied on a computer readable medium comprising program code, that when executed, performs one or more of the techniques.

Additional details of various embodiments are set forth in the accompanying drawings and the description below. Other features, objects and advantages will become apparent from the description and drawings, and from the claims.

DETAILED DESCRIPTION

In general, this disclosure describes a security key (hereafter "key") update scheme for use in mobile IP networks. The update scheme may be implemented to facilitate key updates between a mobile device and a network device, such as a server computer that authenticates the mobile device. The key may be similar to a password, and may be used by the mobile device for authentication during an attempt by the mobile device to access a packet-based network. In various scenarios, however, it may be desirable to change the key, such as in response to a known threat of misappropriation of the key, or on a periodic basis to anticipate and thwart potential threats. In any case, the techniques described herein can facilitate key updates in a manner that accounts for potential message loss during the update routine, mobile device failure during the update routine, or other problems typically encountered in a mobile network setting. In this manner, the techniques can provide a robust scheme for key updates and can improve network security.

Figure 1:
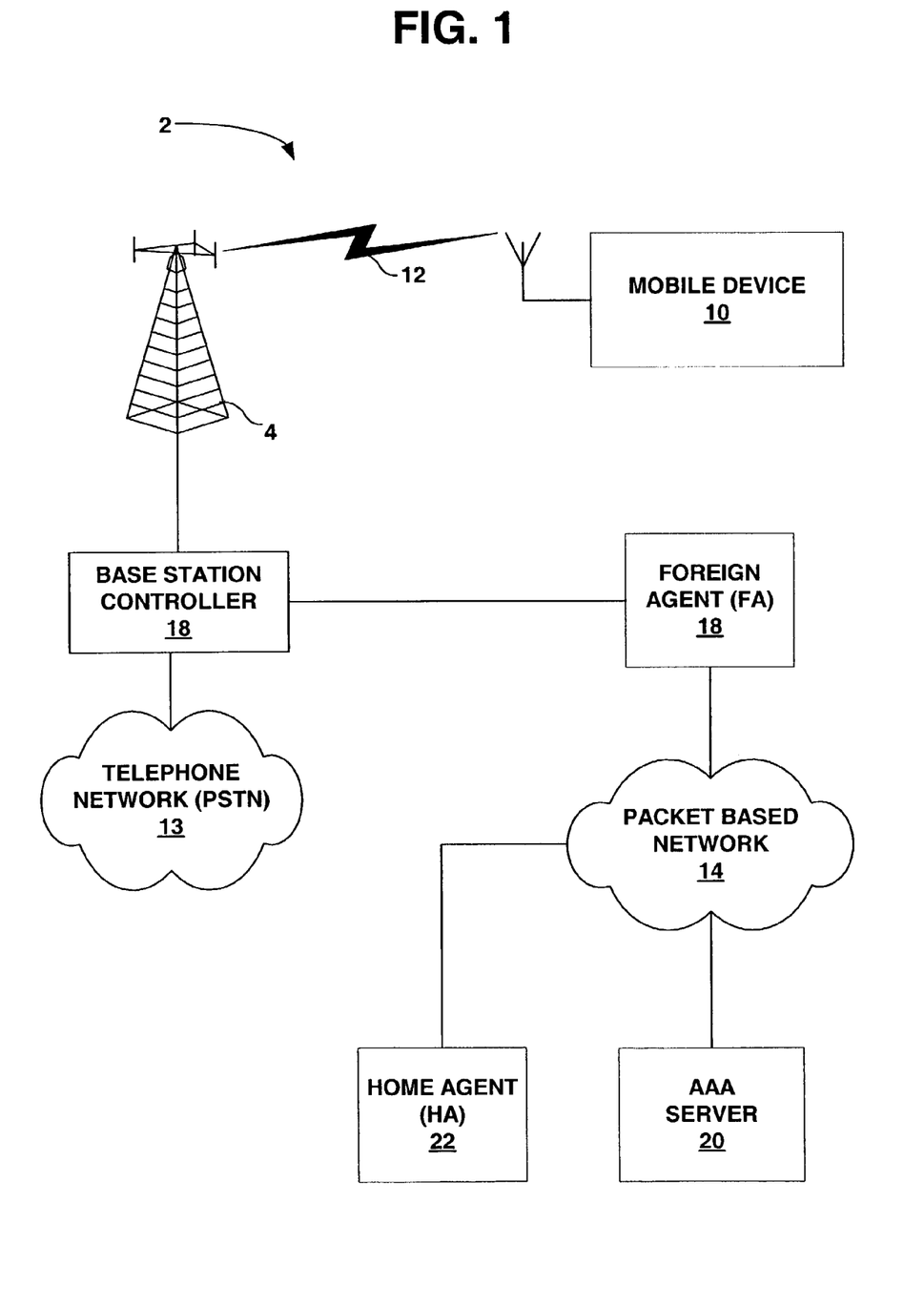
FIG. 1 is a block diagram illustrating a system configured to support a mobile networking protocol in which a security key update routine may be executed by a mobile device and an AAA server.

FIG. 1 is a block diagram illustrating a system 2 configured to support a mobile networking protocol such as Mobile IP, or the like. In particular, system 2 includes a mobile device 10 that can gain access to a packet based network 14 via the mobile network protocol. Mobile device 10 may be any device that is capable of being moved to different geographic locations. For example, mobile device 10 may comprise: a desktop, laptop, or portable computer operating in a Windows™, Macintosh™, Unix, or Linux environment; a personal digital assistant (PDA) based on the Palm™, Windows CE, or similar operating system environments for small portable devices, or other wireless device such as a mobile telephone; an interactive television; a wireless data terminal; a wireless data collection device; and the like.

By way of example, many details of this disclosure are outlined in the context of a mobile device 10 in the form of a mobile telephone. In that case, mobile device 10 may be configured to communicate both voice communication signals, and data packets that can be transferred through a packet-based network 14. Mobile device 10 exchanges wireless signals 12 with a base station 4. The wireless signals 12 may comprise signals modulated according to any of a variety of modulation techniques, including, for example, code division multiple access (CDMA) modulated signals, time division multiple access (TDMA) modulated signals, frequency division multiple access FDMA modulated signals, or various combinations of two or more modulation techniques.

Mobile device 10 may be designed, for example, to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named. "3rd Generation Partnership Project 2" (3GPP2) and embodied in a set of documents including "TR45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), (5) the HDR system documented in TIA/EIA-IS-856, "CDMA2000 High Rate Packet Data Air Interface Specification", and (6) some other standards. Alternatively or additionally, mobile device 10 may be designed to support other standards, such as the GSM standard or related standards, e.g., the DCS1800 and PCS1900 standards. GSM systems employ a combination of FDMA and TDMA modulation techniques. Mobile device 10 may also support other FDMA and TDMA standards.

Alternatively, signals 12 may be modulated according to a modulation scheme used for wireless networking, such as the binary phase shift keying (BPSK) or quadrature phase shift keying (QPSK) modulation schemes typically implemented by devices compliant with the IEEE 802.11b wireless networking standard or the OFDM modulation scheme typically implemented by devices compliant with the IEEE 802.11g or IEEE 802.11a wireless networking standards. Also, signals 12 may be modulated according to a modulation scheme defined by the Bluetooth Special Interest Group. In those cases, however, an access point (rather than base station 4) would be used to receive and forward signals from mobile device 10.

In the example illustrated in FIG. 1, base station transceiver subsystem BTS 4 receives wireless signals 12 from mobile device 10. A Base station controller (BSC) 16 may either include BTS 4 or the BTS 4 may be geographically remote from the BSC 16. The BTS demodulates the signals transmitted from the mobile device 10. BSC 16 may provide an interface between the base station 4 and a public switched telephone network (PSTN) 13 such that telephone calls can be routed to and from mobile device 10. In addition, BSC 16 may provide an interface between BTS 4 and a foreign agent (FA) 18 connected to packet based network 14 such that packets can be routed to and from mobile device 10. BSC 16 may identify which demodulated signals correspond to voice data and which demodulated signals correspond to packets, and may forward the data accordingly. For example, if the wireless signal corresponds to a data call, BSC 16 may forward the data to an agent of packet based network 14.

In other embodiments in which mobile device 10 is not a mobile phone, mobile device 10 may communicate with an access point that is connected to an agent of packet based network 14. In that case, however, mobile device 10 would not typically have access to PSTN 13. These and other configurations of a mobile IP network may also implement the techniques described below. In some embodiments, mobile device 10 may even be connected to an agent via a physical transmission line, e.g., a temporary wired connection. In that case, the robust update scheme described below may be used to avoid problems that might be caused by data collisions on the transmission line. In still other embodiments, the mobile device 10 may be connected directly to the network without the use of a foreign agent.

In any case, in order to gain access to packet based network 14, mobile device 10 may require authorization from an AAA (authentication, authorization and accounting) server 20. For example, an Internet service provider (ISP) may maintain AAA server 20 to perform authentication, authorization and accounting functions. In other words, in a mobile IP environment; AAA server 20 can authenticate and authorize mobile device 10 to access network 14, and can provide accounting of the air time usage of mobile device 10 so that the user of mobile device 10 can be billed by the ISP accordingly.

In a system, such as system 2, that supports mobile IP protocols, mobile device 10 may have an IP address on a home sub-network. This home IP address can be administered in the same way IP address is assigned to a stationary host. The home IP address is used to route packets to the home agent (HA) 22, which is typically a router on the home sub-network of mobile device 10. In addition, HA 22 may tunnel packets for delivery to the mobile device 10 when it is away from home, and can maintain current location information for mobile device 10.

When away from its home sub-network mobile device 10 may be assigned an FA 18. In an IS-835-A network, the FA 18 is referred to as a packet data service node (PDSN) and is typically a router on the visited sub-network. The PDSN provides routing services to mobile device 10. In an IS-835-A network the PDSN may also have additional functionality in addition to acting as the FA. In any case, FA 18 may deliver packets to mobile device 10, such packets having been tunneled over network 14 by HA 22. For packets sent by mobile device 10, the FA 18 may serve as a default router for sending packets to other devices attached to network 14.

As mentioned above, in order to gain access to packet based network 14, mobile device 10 may require authorization from a service provider. For example, authorization can be achieved using a key. For example, mobile device 10 may transmit the key with a registration request according to a password authentication protocol (PAP). Alternatively, in an insecure system the mobile device 10 may generate an authenticator value formed using the key. For example, the mobile device 10 may generate a response to a challenge handshake authentication protocol (CHAP) using the key. The response can then be verified by AAA server 20 to verify the user of mobile device 10. In these, or possibly other ways, mobile device 10 can request authorization using its key. The key is akin to a password that authenticates that the user of mobile device 10 is an authorized customer of the service provider associated with AAA server 20.

Upon receiving from mobile device 10 a registration request that was formed using an authorized key, AAA server 20 enables mobile device 10 to access the resources and information stored on various computers within packet-based network 14. For accounting purposes, AAA server 20 may also record the amount of air-time used by the mobile device 10 in accessing packet based network 14. Packet based network 14, for example, may comprise a global network such as the Internet, or may comprise a smaller public or private network.

In certain instances, it may be desirable to change the key for mobile device 10. For example, if a maverick device gains access to the key, the maverick device may be able to access packet based network 14 as an unauthorized user. The term "maverick device" refers to a device that accesses or attempts to access network 14 using the key of another device. If successful, the maverick device may be able to steal air-time from mobile device 10, or steal air-time from the service provider. Additionally, the maverick device may use the key to access network 14 under the guise of another user, and may perform cyber-crime or cyber-terrorism. For these and other reasons, it may be desirable to change the key of mobile device 10, such as in response to a known maverick threat, or on a periodic basis to anticipate and thwart potential maverick threats.

Figure 2:
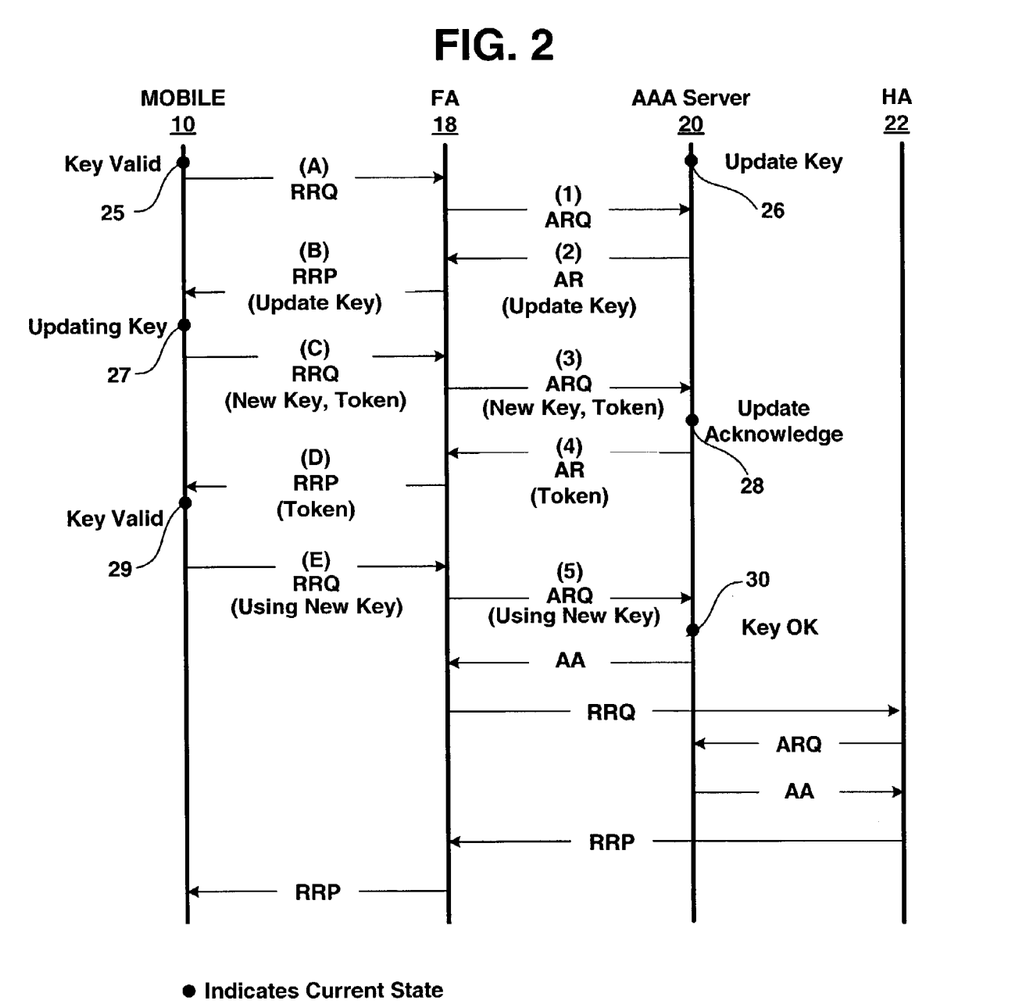
FIG. 2 is a message flow diagram illustrating communication between a mobile device and an AAA server through a foreign agent in order to perform a security key update in accordance with an embodiment.

FIG. 2 is a message flow diagram illustrating communication between mobile device 10 and AAA server 20 through FA 18. The communications may actually be sent through various other devices such as base station 16 (FIG. 1) or a wireless network access point (not shown).

The key updating process shown in FIG. 2 may involve a sequence of events, where mobile device 10 and AAA server 20 transition through various states in response to the events. If an event, i.e., a transmitted request or a transmitted replay, is missed or lost during transmission, mobile device 10 or AAA server 20 can respond accordingly to ensure that all of the desired events take place. In this manner, mobile device 10 and AAA server 20 can ensure that they do not become out of sync with one another. In this way, mobile device 10 and AAA server 20 can avoid a scenario where stored keys do not match.

In one embodiment, mobile device 10 may transition between two possible states during the key update process, and AAA server 20 may transition through three possible states. By this process, an update of the key, as well as an acknowledgement of the update, may be required before both mobile device 10 and AAA server 20 commit the new key to memory and recognize the new key for use by mobile device 10 to access network 14. The techniques illustrated in FIG. 2 may achieve several advantages, including the avoidance of problems when one or more communications are lost during the update process. The techniques may be implemented by modifying only mobile device 10, AAA server 20 and FA 18. Accordingly, the technique may be transparent to the other devices of system 2. Mobile device 10 and AAA server 20 can be modified to include respective state machines, and FA 18 can be modified to ensure that it does not end a call when it receives an access reject (AR) during the key update routine.

As shown in FIG. 2, mobile device 10 may originally be in a "key valid" state (as indicated at 25). In the key valid state, mobile device 10 has a key stored in memory to be used in accessing network 14. Mobile device 10 attempts to establish a mobile IP session by sending a registration request (RRQ) (A). FA 18 receives the RRQ (A) and sends an access request (ARQ) (1). In one embodiment, the ARQ is in accordance with a RADIUS (remote authentication dial-in user service) client/server protocol, which is well known in the art. The ARQ (1) is received by AAA server 20 to validate mobile device 10.

In the normal case, AAA server 20 may accept the authentication information, if correct, and can respond with an access accept (AA) message. In the diagram of FIG. 2, however, AAA server 20 is originally in an "update key" state (as indicated at 26). In that case, rather than verifying the ARQ, AAA server 20 responds with a reply in the form of an access reject (AR) (2) indicating that mobile device 10 must update its key. FA 18 receives the AR (2) and sends a registration reply (RRP) (B) to instruct mobile device 10 to update its key.

AAA server 20 may be placed into the update key state by any of a variety of stimuli or events. For example, the service provider may place AAA server 20 into the update key state in response to a mobile user's request, or in response to a known breach of security. Alternatively, AAA server 20 may periodically enter the update key state in order to thwart any potential security breaches. In any case, once AAA server 20 is placed in the update key state, it will initiate the update key routine when it receives an ARQ that corresponds to an RRQ from mobile device 10.

Once mobile device 10 receives the RRP (B) indicating that it must update its key, mobile device 10 enters an update key state (as indicated at 27). In the update key state, mobile device 10 generates a new key and a token. For example, mobile device 10 may include a random number generator, such as a hardware based energy calculator that calculates the amount of received electromagnetic energy at a given instance and generates a random number based on the random amount of received electromagnetic energy at the given instance. The token may be generated in a similar manner, and corresponds to a separate number that will be used to acknowledge the subsequent reception of the new key by AAA server 20. The generation and exchange of a token, however, is an example of only one method of achieving such acknowledgement. In some embodiments, mobile device 10 may generate and/or transmit a number of keys including a mobile-AAA key, a mobile-HA key, a CHAP-key, or other authentication keys.

Mobile device 10 then sends the RRQ (C), which includes the new key (or multiple new keys) and the token. FA 18 receives the RRQ (C) and sends an ARQ (3) to AAA server 20 that includes the new key(s) and the token. The new key(s) and the token may be protected against potential eavesdropping by an external host, or some other external means. For example, the newly generated key(s) may be encrypted using a separate encryption key known only to mobile device 10 and AAA server 20.

FA 18, for example, may include a lookup table to convert an incoming request in RRQ format used by mobile device 10 to outgoing requests in ARQ format used by AAA server 20, or to convert incoming replies in AR format to outgoing replies in RRP format. The information contained in the requests and replies, however, generally does not change when FA 18 translates the request or replay from one format to another. Thus, if the RRQ (C) includes the new key and the token, the ARQ (3) similarly includes the new key and the token.

Upon receiving the ARQ (3), AAA server 20 stores the new key(s) in memory and transitions to an update acknowledge state (as indicated at 28). AAA server 20 then decrypts the message and responds with an AR (4) returning the token to mobile device 10 which authenticates the AAA server 20 to mobile device 10. This proves to mobile device 10 it is communicating with the correct AAA server and indicates to mobile device 10 that the new key transmitted to AAA server 20 was received. FA 18 receives the AR (4) and sends an RRP (D) to forward the token back to mobile device 10. In other embodiments, however, the generation and exchange of the token can be eliminated in favor of another technique for indicating to mobile device 10 that the new key transmitted to AAA server 20 was received.

Upon receiving the RRP (D) with the token, mobile device 10 can transition back to the key valid state (as indicated at 29) if the token matches with the one the mobile device 10 previously sent in the RRQ (C). Mobile device 10 then makes a normal registration request, RRQ (E), formed using its new key. Again, the normal registration request formed using the new key may involve transmitting the key, transmitting an authorization value generated using the key, responding to a CHAP challenge, or the like.

In any case, FA 18 receives the RRQ (E) and sends an AR (5) to AAA server 20. Once AAA server 20 receives the AR (5) that corresponds to a request generated using the new key, AAA server 20 transitions to key OK state (as indicated at 30), commits the stored new key(s) to permanent memory, and replies to FA 18 with an access accept (AA). FA 18 may then be authorized to communicate with HA 22.

As part of the Mobile IP protocol, FA 18 forwards the RRQ to HA 22. As part of the Mobile-HA authentication, the HA 22 sends an ARQ to AAA server 20. The AAA server 20 sends an AA to HA 22 with a Mobile-HA key, which can also be generated by mobile device 10 and transmitted to AAA server 20 with the transmission of the new key and token as outlined above. HA 22 verifies the Mobile-Home Authentication extension using the Mobile-HA key. HA can then send an RRP to-foreign agent, which in turn can send the RRP to mobile device 10. In this manner, data can be routed to mobile device 10 via tunneling between HA 22 and PA 18 once the key of mobile device 10 is updated and then validated by AAA server 20.

The key updating routine illustrated in the diagram of FIG. 2 avoids problems that may arise if one or more communications are lost during the update process. In particular, the use of at least three separate states in AAA server 20 and at least two separate states in mobile device 10 ensures that the system can handle the potential for messages being lost during the update routine. In that case, if the AAA server 20 is expecting the next ARQ in a series of defined ARQs of the update routine, but receives a different ARQ, the AAA server 20 can respond by resending a previously transmitted AR to ensure that mobile device 10 and AAA server 20 have the same key. Accordingly, a key on the mobile device 10 will not become out of sync with a key stored on AAA server 20. Loss of key synchronization could render mobile device 10 unable to access the local network due to authentication failure.

Additionally, the techniques illustrated FIG. 2 may avoid problems associated with a power failure of mobile device 10 during the key update routine. Also, problems may be avoided if events, such as loss of air-link, reset, call failure, or other interrupts, occur during the update routine. In those cases, the mobile device 10 and AAA server 20 can remain in sync, and the AAA server 20 can avoid becoming stuck in a transitory state. Instead, the update key routine may continue by resending one or more communications that were previously sent, but not received or acknowledged. Importantly, once AAA server 20 receives the new key, it replies with the token reply or another reply sufficient to communicate to mobile device 10 that the new key was received. Then, AAA server 20 does not transition to key OK state until it receives an ARQ corresponding to an RRQ that was sent using the new key. Thus, the key update routine may not be finalized until every event of the update scheme occurs.

The technique illustrated in FIG. 2 may also facilitate handling of problems that might otherwise be caused by: (1) the retransmission of one or more communications once the communications were already received, or (2) the transmission of other communications during the update routine, such as denial of service communications from the AAA server 20 to mobile device 10. In those cases, the key update routine would not be finalized because certain events had not occurred. Additionally, the above disclosed techniques can be implemented by modifying only mobile device 10 and AAA server 20 with respective state machines, and modifying FA 18 to ensure that calls are not ended when FA 18 receives an AR during the key update routine. In other words, no modifications are required to the other devices of system 2 in order to realize these techniques.

Figure 3:
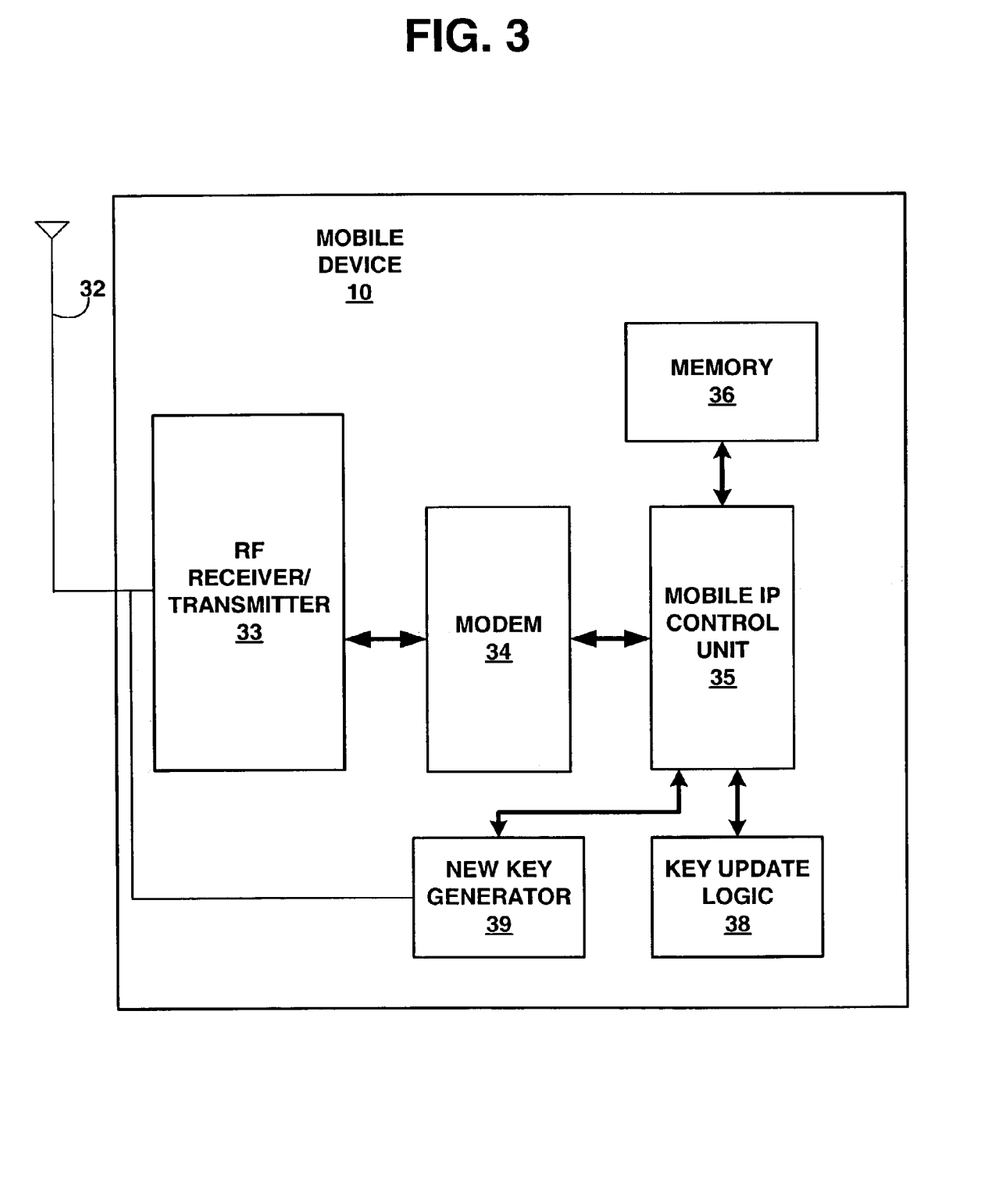
FIG. 3 shows a block diagram of one example of a mobile device configured for implementation of a security key update routine as described herein.

FIG. 3 is a block diagram of one example of a mobile device 10 configured for implementation of a key update routine as described above. In this example, mobile device 10 includes various components including an antenna 32, an RF receiver/transmitter 33, a modem (modulation-demodulation unit) 34, a mobile IP control unit 35, a memory 36, a key update logic 38 and a new key generator 39.

RF receiver/transmitter 33 transmits and receives, via antenna 32, modulated electromagnetic signals. RF receiver/transmitter 33 may also perform analog-to-digital conversion of incoming signals and digital-to-analog conversion of outgoing signals. RF receiver/transmitter 33 may comprise separate receiver and transmitter components, or may comprise an integrated unit, i.e., a transceiver. Modem 34 may comprise a digital processor that modulates outgoing signals and demodulates incoming signals.

Mobile IP control unit 35 controls the transmission and reception of communications in the mobile IP protocol. For example, during the registration routine, mobile IP control unit 35 may generate outgoing RRQs, and may interpret incoming RRPs. In addition, mobile IP control unit 35 may use a key in order to generate an authenticator to validate the identity of mobile device 10. Mobile IP control unit 35 may access memory 36 to obtain the key for use during the registration process. In addition, mobile IP control unit 35 may access key update logic 38 to identify whether mobile device 10 has entered a key update state.

Key update logic 38 may include state logic for transitioning the state of mobile device 10 during a key update routine. In particular, if mobile IP control unit 35 interprets an incoming RRP as an update key message from AAA server, key update logic 38 transitions mobile device 10 to the update key state. In the update key state, mobile IP control unit 35 may invoke new key generator 39 to generate a new key to be transmitted to AAA server 20. In one example, new key generator 39 may generate at least two new numbers: 1) a new key and 2) a token. Mobile device 10 can then transit an RRQ with the new key and the token, and may remain in the key update state until it receives an acknowledgment in the form of an RRP that contains the token. In some embodiments, mobile device may generate and/or transmit a number of keys, such as a mobile-AAA key, a mobile-HA key, a CHAP-key, and so forth. Some, or all, of the keys may be newly generated keys, or some keys may be previously stored and other keys may be newly generated. In other cases, the generation and exchange of a token can be avoided in favor of some other acknowledgment technique.

New key generator 39 may comprise any circuit capable of generating random or pseudo-random numbers. In one example, as mentioned previously, new key generator 39 comprises a hardware based energy calculator that calculates the amount of electromagnetic energy received by antenna 32 at a given instance, and generates a random number based on the random amount of received electromagnetic energy at the given instance. The token may be generated in a similar manner. If desired, mobile IP control unit 35 may also encrypt the key and token prior to transmission, such as by using an encryption key known only to mobile device 10 and AAA server 20. In any case, the newly generated key and token may be stored in memory 36 for later use.

Upon entering the update key state, mobile device 10 may remain in the update key state until it receives a token reply. Thus, after transitioning to the update key state, if mobile device 10 does not receive a token reply within an allotted amount of time, it retransmits the same key(s) along with the token, and if mobile device 10 receives an update key request it retransmits the newly generated key(s) and token and ignores other communication. In any case, the configuration of FIG. 3 allows mobile device 10 to deal with scenarios where communications are lost or otherwise not received. In those cases, mobile device 10 can simply repeat one or more steps of the key update routine in order to ensure that the proper events occur to keep the mobile device 10 and AAA server 20 in sync, before mobile device 10 attempts use of the new key to gain access to network 14(FIG. 1).

Figure 4:
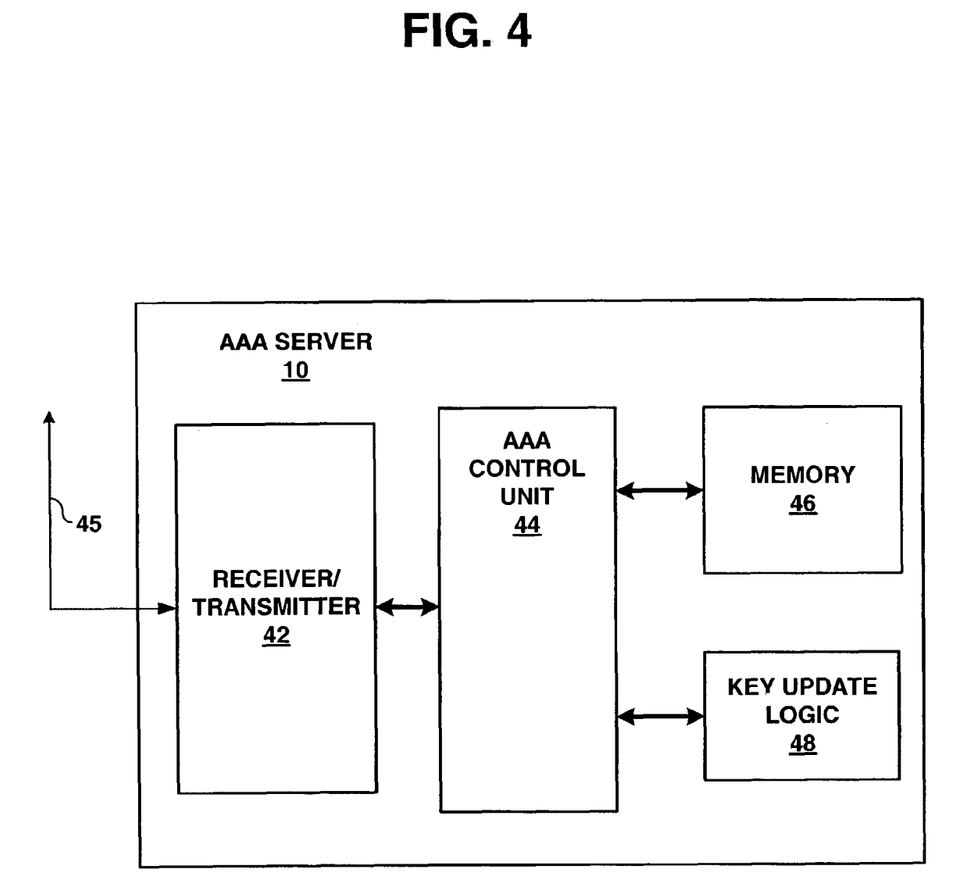
FIG. 4 shows a block diagram of one example of a AAA server configured for implementation of a security key update routine as described herein.

FIG. 4 shows a block diagram of an example of an AAA server 20 configured for implementation of a key update routine as described herein. In this example, AAA server 20 includes various components including a receiver/transmitter 42, an AAA control unit 44, a memory 46 and a key update logic 48.

Receiver/transmitter 42 transmits and receives signals 45 according to IPs and mobile IPs. In particular, receiver/transmitter 42 may be a circuit that receives signals in the form of ARQs and transmits signals in the form of ARs or AAs. Receiver/transmitter 42 may comprise separate receiver and transmitter components, or may comprise an integrated unit, i.e. a transceiver. Receiver/transmitter 42 may operate in the digital realm, although this disclosure is not necessarily limited in that respect.

AAA control unit 44 may comprise hardware or software modules executed by a processor. In any case, AAA control unit 44 may be configured to perform authentication, authorization and accounting services. Memory 46 may store a list of keys and associated users or devices for which AAA server 20 can grant network access. When a network device supported by AAA server 20 requests network access, such as by transmitting a registration request formed using the respective key, AAA server 20 authenticates or rejects access to the requesting device based on the corresponding customer key (s) stored in memory 46. Again, the authentication process may involve transmission of the key with a registration request, or transmission of an authentication value generated using the key with a registration request. For example, AAA server 10 may invoke a challenge handshake authentication protocol (CHAP), to which mobile device 10 must respond using the key in order to be authenticated. In any case, if a requesting device transmits a registration request formed using the proper key, AAA server 20 may grant network access to the requesting device.

Key update logic 48 may comprise a state machine configured to cause AAA server 20 to perform the key update routine described herein. Key update logic 48 may define at least three possible states for AAA server 20 in relation to key updates: 1) key OK, 2) update key, and 3) update acknowledge. During normal operation, key update logic may identify the key OK state, in which case, AAA server 20 receives requests from devices requesting access to the network, and performs authentication to verify the user of the requesting device.

In certain instances, key update logic 48 may be placed in the update key state, such as in response to external input, or on a periodic (timed) basis. The update key state may be specific for one particular device to be authenticated by AAA server 20, or may be more general, such that some or all of the devices to be authenticated by AAA server 20 must update their key. In any case, when AAA server 20 is placed in the update key state with respect to any given device that may request network access, it will initiate a key update routine for that device as described herein.

In particular, when AAA server 20 is placed in the update key state, it will send an AR (update key) reply in response to a registration request from the given device. For example, if AAA server 20 receives as an ARQ requesting network access for mobile device 10, AAA server returns an AR (update key) reply indicating that mobile device 10 must update its key. Then, AAA server 20 expects to receive an ARQ from mobile device 10 that includes new key and a token. If AAA server 20 receives the ARQ (new key, token) request, AAA control unit 44 stores the new key in memory 46, and key update logic transitions AAA server 20 to the update acknowledge state. AAA server 20 then sends an AR (token) reply to return the token to mobile device 10 and thereby indicate to mobile device 10 that AAA server 20 received the new key. Again however, in accordance with the principles of this disclosure, other techniques (other than the exchange of a token) may be used to indicate to mobile device 10 that AAA server 20 received the new key AAA server 20 does not return to the key OK state until it receives another ARQ corresponding to an RRQ sent by mobile device 10 and formed using the new key. At that point, it is known that AAA server 20 and mobile device 10 are in sync with respect to the new key, and that no communications in the update key routine were lost. Thus, AAA server 20 treats the subsequent ARQ that corresponds to an RRQ sent by mobile device 10 using the new key, as both an acknowledgment from mobile device 10 that it received AAA server's token reply, and also as a request for access to the network. Accordingly, when AAA server 20 receives the ARQ that corresponds to an RRQ sent by mobile device 10 using the new key, key update logic 48 transitions to the key OK state, and AAA control unit performs authentication of mobile device 10.

Figure 5:
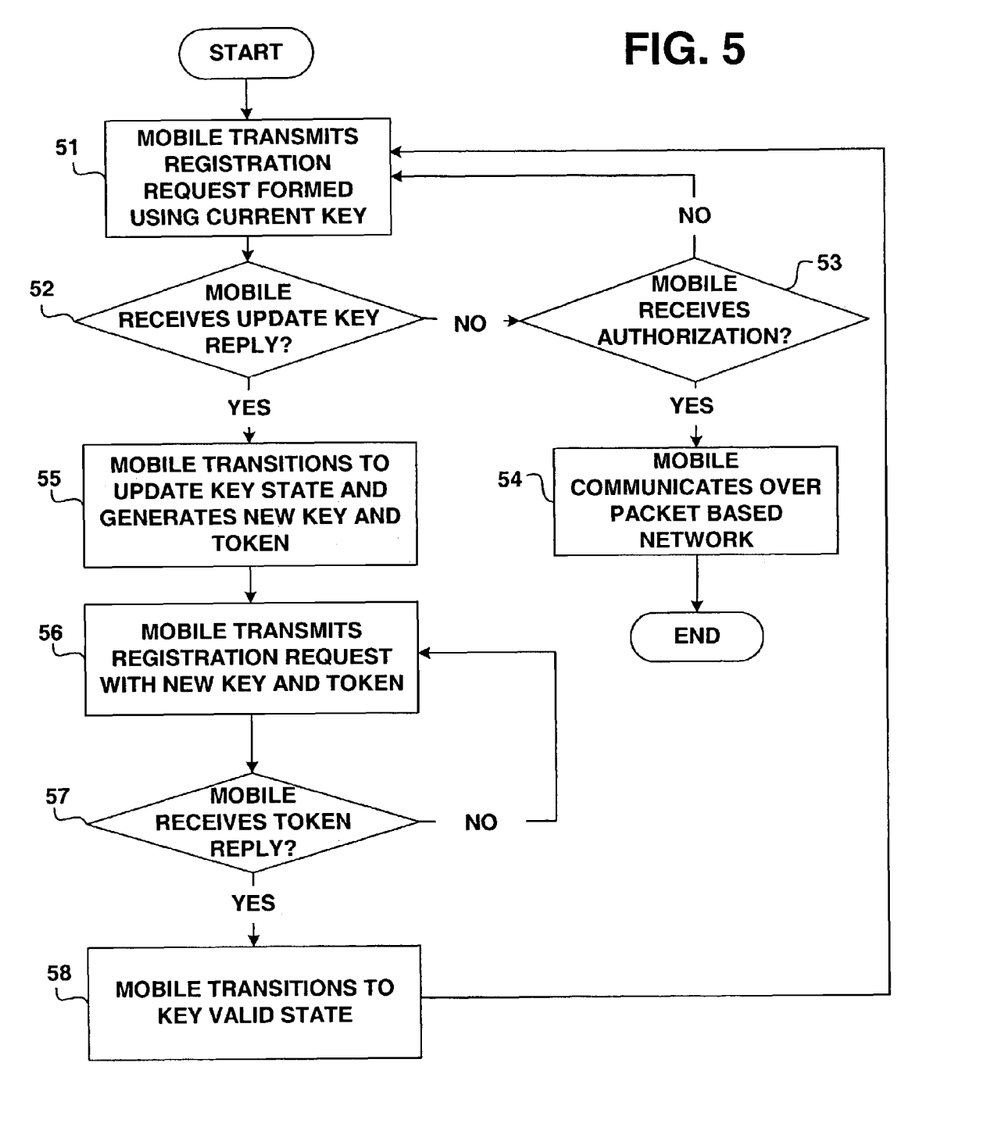
FIG. 5 shows a flow diagram illustrating one example of a security key updating routine from the perspective of a mobile device.

FIG. 5 is a flow diagram illustrating an embodiment of a key updating routine from the perspective of mobile device 10. As shown in FIG. 5, transmitter/receiver 33 transmits a registration request (RRQ) (51). For example, mobile IP control unit 35 may generate the RRQ using its current key and modem 34 may modulate the RRQ and convert the modulated digital signal to an analog RF signal to be sent by transmitter/receiver 33 via antenna 32. During normal operation, mobile device 10 would not receive an update key reply (no branch of 52). Instead, during normal operation, mobile device 10 would receive a reply either accepting the request or rejecting the request. If mobile device 10 receives authorization from AAA server 20 (yes branch of 53), then mobile device 10 may gain access to packet based network 14 (FIG. 1) allowing mobile device 10 to communicate over the packet based network 14 (54). On the other hand, if mobile device 10 receives a rejection from AAA server 20 (no branch of 53), then mobile device 10 may attempt registration by transmitting another registration request (51).

If AAA server 20 is in the update key state, however, then mobile device 10 may receive an update key reply in response to its registration request (yes branch of 52). In that case, key update logic 38 transitions mobile device 10 to an update key state, and new key generator 39 generates a new key and a token (55). Mobile device then sends a registration request with the new key and the token (56). For example, mobile IP control unit 35 may generate the RRQ (new key, token) using the newly generated key and newly generated token, and modem 34 may modulate the RRQ (new key, token) and convert the modulated digital signal to an analog RF signal to be sent by transmitter/receiver 33 via antenna 32. If mobile device 10 is reset after transitioning to the update key state 55, it may also transmit the RRQ (new key, token) (56) following such a reset.

In response to the RRQ (new key, token), if mobile device 10 receives a token reply RRP (token) (yes branch 57), then mobile device 10 knows that AAA server 20 received the new key. In that case, key update logic 38 transitions mobile device 10 back to the key valid state (58), and mobile device 10 transmits a normal registration request formed using the current key (51), which corresponds to the new key. If mobile device 10 receives authorization from AAA server 20 (yes branch of 53), then mobile device 10 may gain access to packet based network 14 (FIG. 1) allowing mobile device 10 to communicate over the packet based network 14 (54). If desired, mobile device 10 may also implement timers to cause retransmissions of any given registration request if the expected response is not received within the timing interval.

Figure 6:
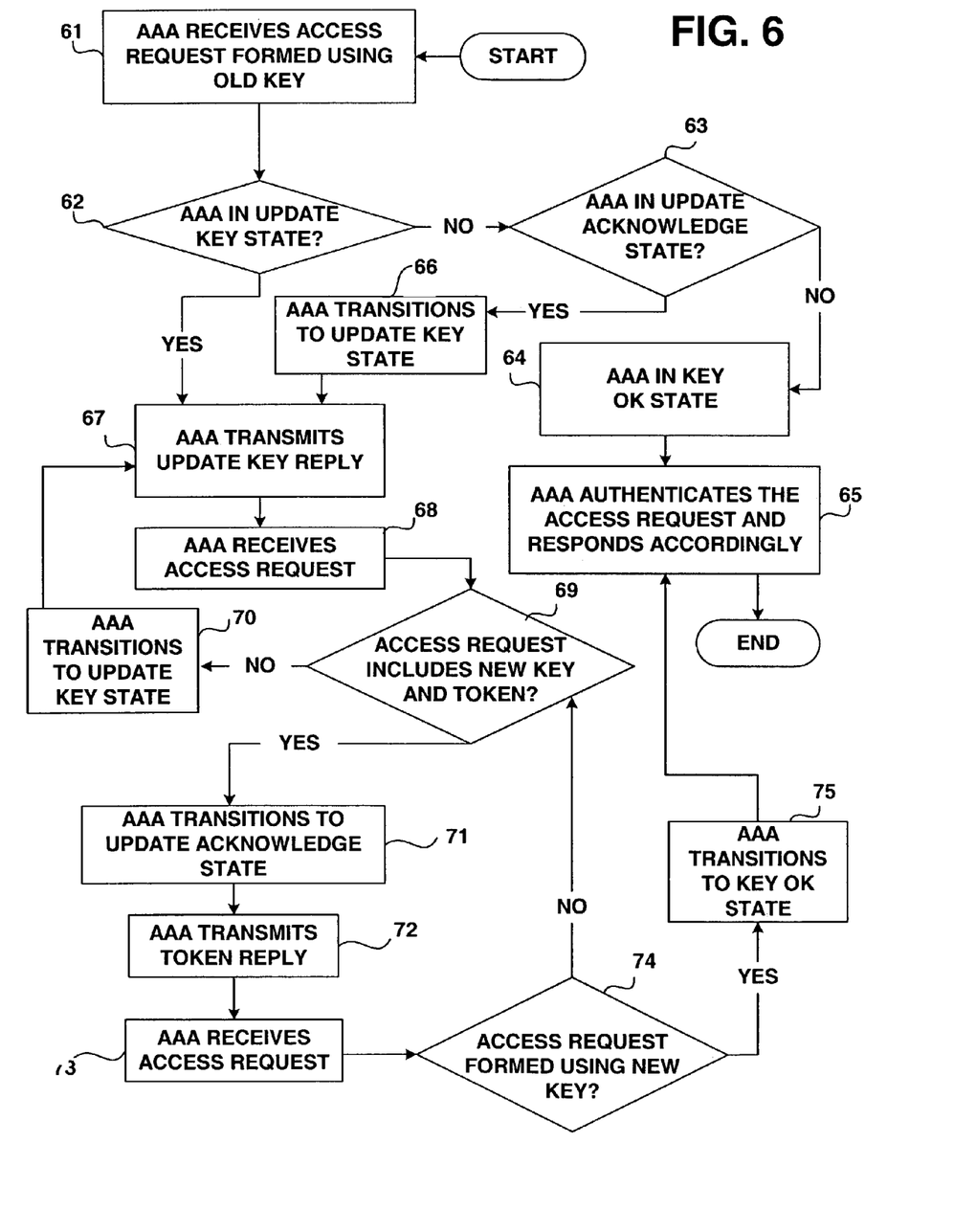
FIG. 6 shows a flow diagram illustrating one example of a security key updating routine from the perspective of an AAA server.

FIG. 6 is a flow diagram illustrating an embodiment of a key updating routine from the perspective of AAA server 20. As shown, when receiver/transmitter 42 receives an access request formed using an old key (61), AAA control unit 44 invokes key update logic 48 to determine the state of AAA server 20. If AAA server is not in an update key state (no branch of 62) or an update acknowledge state (no branch of 63), then AAA server 20 is in the key OK state (64). In that case, AAA control unit 44 authenticates the access request and responds to mobile device 10 accordingly (65). In particular, AAA control unit 44 may examine a transmitted key and compare it to keys stored in memory 46. Alternatively, AAA control unit may examine a transmitted authorization value generated using the key, and extract the key from the authorization value for comparison to the keys stored in memory. In another example, AAA control unit 44 may examine the mobile device's response to a CHAP challenge invoked by the registration request.

In any case, if mobile device 10 sent a registration request formed using a proper key, AAA server 20 may respond by sending an access accept reply to authorize mobile device 10 to access network 14 (FIG. 1). If not, AAA server 20 may respond by sending an access reject to refuse mobile device 10 access to network 14.

However, if AAA server 20 is in the update key state (yes branch of 62), then AAA server 20 may initiate an update key routine with mobile device 10. Also, if for some reason, AAA server 20 is initially in the update acknowledge state (yes branch of 63), AAA server 20 may transition to the update key state (66). In any case, once AAA server 20 is in the update key state, AAA control unit 44 may generate an update key reply for transmission by receiver/transmitter 42 (67). Then, after sending the update key reply, if AAA server 20 receives an access request (68) that includes a new key and a token (yes branch of 69), key update logic 48 transitions AAA server 20 to an update acknowledge state (71), and AAA server 20 transmits an access reply that includes the token (72). In particular, AAA control unit 44 may generate the token reply, and receiver/transmitter 42 may send the token reply to indicate to mobile device 10 that it is communicating with the correct AAA server. Furthermore, reception of the token reply by mobile device 10 can provide an indication that the new key was received by AAA server 20.

Then, after transmitting the token reply (72), if AAA server 20 receives an access request (73) corresponding to an RRQ sent by mobile device 10 and formed using the new key (yes branch of 74), key update logic 48 transitions AAA server 20 to a key OK state (75). At that point AAA server 20 may commit the new key to permanent memory, and AAA control unit 44 may authenticate the access request and respond to mobile device 10 accordingly (65). In particular, AAA control unit 44 may authenticate mobile device 10 by determining whether mobile device 10 used the new key that corresponds to the key previously received by AAA server 20 as part of the key update routine.

The key update technique described may avoid problems if one or more communications are lost during the update process. For example, if after AAA server 20 transmits the token reply (72), it receives another access request including the new key and the token (73, no branch of 74, and yes branch of 69), the AAA server 20 may remain in the update acknowledge state (71) and retransmit the token reply (72). In that case, AAA server 20 may assume that the previous token reply was lost or otherwise not received by mobile device 10.

Also, if AAA server 20 expects an access request with a new key and a token, but does not receive such a request (no branch of 69), the AAA server 20 may restart the update key routine. Accordingly, in that case, AAA server may transition to the update key state (70) and retransmit another update key reply (67). In this manner, proper execution of the update routine, i.e., proper execution of all of the events of the update keys routine occurs. Specifically, once AAA server 20 is placed in the update key state (62, 66 or 70), it will not transition to the key OK state until it first receives an access reply with the new key and the token (yes branch of 69), and then receives an access request corresponding to an RRQ sent by mobile device 10 and formed using the new key (yes branch of 77).

The techniques described facilitate handing of problems that might otherwise be caused by: (1) the retransmission of one or more communications once the communications were already received, or (2) the transmission of other communications during the update routine, such as denial of service communications from the AAA server 20 to mobile device 10. In those cases, the key update routine would not be finalized because all the events of the update key routine had not occurred. Additionally, these techniques can be implemented by modifying only mobile device 10 and AAA server 20 with respective estate machines and modifying FA 18 to ensure that calls are not ended when it receives access rejects (AR) during the key update routine. In other words, the modifications to realize the techniques can be done without modifying the other devices of system 2. Also, the update routine described herein may be less susceptible to maverick attacks, since all of the events of the update routine are executed before AAA server 20 transitions to the key OK state.

The techniques described herein may be implemented by mobile devices and servers that authenticate the users of the mobile devices. The techniques may be implemented in hardware, software, firmware, or any combination thereof. If implemented in software, the techniques may be directed to a computer readable medium comprising program code that, when executed, performs one or more of the techniques described herein. The computer readable medium may store computer readable instructions that, when executed in a processor such as a digital signal processor (DSP), cause the respective mobile device or server to carry out one or more of the techniques described herein. Many details have been provided in the context of a particular example of a network. However, similar techniques may be applicable to various other wireless networks. These and other embodiments are within the scope of the following claimed invention.

The invention claimed is:

1. A method comprising:
  receiving a first registration request for access to a network, the first registration request being formed using a key;
  sending a first reply, responsive to the first registration request, indicating that a key update is necessary to access the network;
  receiving a second registration request including a new key;
  sending, without authorizing access to the network, a second reply indicating that the new key was received in response to the second registration request;
  receiving the second registration request for a second time;
  resending the second reply in response to receiving the second registration request for a second time;
  receiving a third registration request, the third registration request being formed using the new key; and
  authorizing access to the network in response to receipt of the third registration request.

2. A method comprising:
  receiving a first registration request for access to a network, the first registration request being formed using a key;
  sending a first reply, responsive to the first registration request, indicating that a key update is necessary to access the network;
  receiving a second registration request including a new key;
  sending, without authorizing access to the network, a second reply indicating that the new key was received in response to the second registration request;

receiving a third registration request formed using the new key; and authorizing access to the network in response to receipt of the third registration request.

3. The method of claim 1, wherein the second registration request includes the new key and a token, and the second reply includes the token.

4. The method of claim 1, further comprising sending the first reply for a second time in response to receiving the first registration request for a second time prior to authorizing access to the network.

5. The method of claim 1, further comprising sending the first reply for a second time in response to receiving for a second time a registration request that was not formed using the new key.

6. The method of claim 1, further comprising:

storing the new key upon receiving the second registration request; and using the new key for use in authentication after storing the new key.

7. A method comprising:

sending a first registration request formed using a key to request access to a network;

receiving a first reply indicating that a key update is necessary to access the network;

sending a second registration request including a new key in response to the first reply;

receiving the first reply for a second time indicating that a key update is necessary to access the network;

sending the second registration request including the new key for a second time in response to receiving the first reply for the second time;

receiving, in response to the second registration request, a second reply indicating that the new key was received without authorizing access to the network;

sending a third registration request formed using the new key; and accessing the network in response to acceptance of the third registration request.

8. The method of claim 7, further comprising resending the second request when the second reply is not received within a defined amount of time after sending a previous second request.

9. A device comprising:

a receiver that receives signals modulated with data;

a transmitter that sends signals modulated with data; and key update logic to update keys for the device, the device being configured such that:

the transmitter sends a first registration request formed using a key to request access to a network;

the receiver receives a first reply responsive to the first registration request, indicating that a key update is necessary to access the network;

the key update logic generates a new key in response to the first reply;

the transmitter sends a second registration request including the new key;

the receiver receives another first reply indicating that a key update is necessary to access the network;

the transmitter sends another second registration request including the new key in response to reception of another first reply;

the receiver receives a second reply in response to the second registration request, the second reply indicating that the new key was received without authorizing access to the network;

the transmitter sends a third registration request formed using the new key; and the device gains access to the network following the third registration request.

10. The device of claim 9, further comprising a modulation unit that modulates data onto the signals sent by the transmitter and a demodulation unit that demodulates data from signals received by the receiver.

11. The device of claim 10, wherein the transmitter and receiver comprise an integrated transceiver and wherein the modulation unit and demodulation unit comprise an integrated modem.

12. The device of claim 9, wherein the device is selected from the group consisting of a mobile phone, a laptop computer, a desktop computer, a personal digital assistant (PDA), a data terminal, and a data collection device.

13. A server comprising:

a receiver that receives data packets;

a transmitter that sends data packets;

an authentication, authorization and accounting (AAA) unit to provide authentication, authorization and accounting of a mobile device in a mobile internet protocol (mobile IP) network; and key update logic to control a key update routine, the server being configured such that:

the receiver receives a first registration request formed using a key, the first registration request requesting access to the mobile IP network;

the transmitter sends a first reply responsive to the first registration request indicating that a key update is necessary to access the network;

the transmitter resends another first reply in response to the receiver receiving another first registration request prior to the server authorizing access to the network;

the receiver receives a second registration request including a new key;

the transmitter sends, without authorizing access to the network, a second reply in response to the second registration request, the second reply indicating that the new key was received;

the receiver receives a third registration request that was formed using the new key; and the server authorizes access to the network for the mobile device in response to the third registration request.

14. The server of claim 13, the server being further configured such that the transmitter resends another second reply in response to the receiver receiving another second registration request prior to the server authorizing access to the network.

15. The server of claim 13, the server being further configured such that the transmitter after sending the second reply, resends another first reply in response to the receiver receiving a registration request that does not include the new key.

16. An apparatus comprising digital circuitry that causes a mobile device to:

send a first registration request formed using a key to request access to a network;

send a second registration request upon receiving a first reply responsive to the first registration request, the first reply indicating that a key update is necessary to access the network, the second registration request including a new key;

resend another second registration request upon receiving another first reply; and send a third registration request formed using the new key upon receiving a second reply responsive to the second registration request, the second reply indicating that the new key was received without authorizing access to the network.

17. The apparatus of claim 16, the digital circuitry further causing the mobile device to resend the second request in response to not receiving the second reply within a defined amount of time.

18. The apparatus of claim 16, wherein the apparatus comprises a state machine executing in the mobile device, and wherein the second registration request includes the new key and a token and wherein the second reply includes the token.

19. An apparatus comprising digital circuitry that causes a server to:
send a first reply responsive to a first registration request, the first registration request being formed using a key, and the first reply indicating that a key update is necessary to access the network;
send, without authorizing access to the network, a second reply responsive to a second registration request, the second registration request including a new key, and the second reply indicating that the new key was received;
send another second reply responsive to another second registration request prior to authorizing network access; and
authorize access to the network in response to a third registration request, the third registration request being formed using the new key.

20. The apparatus of claim 19, the digital circuitry further causing the server to resend another first reply upon receiving another first registration request prior to authorizing access to the network.

21. The apparatus of claim 19, the digital circuitry further causing the server to resend another first reply after sending the second reply upon receiving a registration request that does not include the new key.

22. The apparatus of claim 19, wherein the apparatus comprises a state machine executing in the server, and wherein the second registration request includes the new key and a token and the second reply includes the token.

23. A computer readable storage medium comprising program code that when executed in a mobile device causes the mobile device to:
send a first registration request formed using a key to request access to a network;
send a second registration request upon receiving a first reply responsive to the first registration request, the first reply indicating that a key update is necessary to access the network, the second registration request including a new key;
resend another second registration request upon receiving another first reply; and
send a third registration request formed using the new key upon receiving a second reply responsive to the second registration request, the second reply indicating that the new key was received without authorizing access to the network.

24. The computer readable storage medium of claim 23, further comprising program code that when executed in the mobile device causes the mobile device to resend the second request in response to not receiving the second reply within a defined amount of time.

25. A computer readable storage medium comprising program code that when executed in a network server causes the server to:
send a first reply responsive to a first registration request, the first registration request being formed using a key, and the first reply indicating that a key update is necessary to access the network;
send, without authorizing access to the network, a second reply responsive to a second registration request, the second registration request including a new key, and the second reply indicating that the new key was received;
send another second reply responsive to another second registration request prior to authorizing network access; and
authorize access to the network in response to a third registration request, the third registration request being formed using the new key.

26. The computer readable storage medium of claim 25, further comprising program code that when executed in the server causes the server to resend another first reply upon receiving another first registration request prior to authorizing access to the network.

27. The computer readable storage medium of claim 25, further comprising program code that when executed in the server causes the server to resend another first reply after sending the second reply upon receiving a registration request that does not include the new key.

28. An apparatus comprising:
means for sending a first registration request formed using a key to request access to a network;
means for receiving a first reply responsive to the first registration request, the first reply indicating that a key update is necessary to access the network;
means for sending a second registration request, the second registration request including a new key;
means for resending another second registration request in response to receiving another first reply;
means for receiving a second reply responsive to the second registration request, the second reply indicating that the new key was received without authorizing access to the network;
means for sending a third registration request, the third registration request being formed using the new key; and
means for accessing the network following to the third registration request.

29. An apparatus comprising:
means for receiving a first registration request requesting access to a network, the first registration request being formed using a key;
means for sending a first reply responsive to the first registration request, the first reply indicating that a key update is necessary to access the network;
means for receiving a second registration request, the second registration request including a new key;
means for sending, without authorizing access to the network, a second reply responsive to the second registration request, the second reply indicating that the new key was received;
means for sending another second reply in response to receiving another second registration request;
means for receiving a third registration request, the third registration request being formed using the new key; and
means for authorizing access to the network in response to the third registration request.

30. A processor comprising:
a processing circuit configured to:
send a first registration request formed using a key to request access to a network;

receive a first reply responsive to the first registration request, the first reply indicating that a key update is necessary to access the network;
send a second registration request, the second registration request including a new key;
resend another second registration request in response to receiving another first reply;
receive a second reply responsive to the second registration request, the second reply indicating that the new key was received without authorizing access to the network;
send a third registration request, the third registration request being formed using the new key; and
access the network following to the third registration request.

31. A processor comprising:
a processing circuit configured to:
receive a first registration request requesting access to a network, the first registration request being formed using a key;
send a first reply responsive to the first registration request, the first reply indicating that a key update is necessary to access the network;
receive a second registration request, the second registration request including a new key;
send, without authorizing access to the network, a second reply responsive to the second registration request, the second reply indicating that the new key was received;
send another second reply in response to receiving another second registration request;
receive a third registration request, the third registration request being formed using the new key; and
authorize access to the network in response to the third registration request.

32. A computer readable storage medium comprising program code that when executed in a network server causes the server to:
send a first registration request formed using a key to request access to a network;
receive a first reply responsive to the first registration request, the first reply indicating that a key update is necessary to access the network;
send a second registration request, the second registration request including a new key;
resend another second registration request in response to receiving another first reply;
receive a second reply responsive to the second registration request, the second reply indicating that the new key was received without authorizing access to the network;
send a third registration request, the third registration request being formed using the new key; and
access the network following to the third registration request.

33. A computer readable storage medium comprising program code that when executed in a network server causes the server to:
receive a first registration request requesting access to a network, the first registration request being formed using a key;
send a first reply responsive to the first registration request, the first reply indicating that a key update is necessary to access the network;
receive a second registration request, the second registration request including a new key;
send, without authorizing access to the network, a second reply responsive to the second registration request, the second reply indicating that the new key was received;
send another second reply in response to receiving another second registration request;
receive a third registration request, the third registration request being formed using the new key; and
authorize access to the network in response to the third registration request.

* * * * *